US008291102B2

(12) United States Patent
Guo et al.

(10) Patent No.: US 8,291,102 B2
(45) Date of Patent: Oct. 16, 2012

(54) METHOD AND APPARATUS FOR IMPROVED MULTICAST STREAMING IN WIRELESS NETWORKS

(75) Inventors: Katherine H. Guo, Eatontown, NJ (US); Arun Narayen Netravali, Westfield, NJ (US); Krishan K. Sabnani, Westfield, NJ (US)

(73) Assignee: Alcatel Lucent, Paris (FR)

( * ) Notice: Subject to any disclaimer, the term of this patent is extended or adjusted under 35 U.S.C. 154(b) by 1151 days.

(21) Appl. No.: 11/396,270

(22) Filed: Mar. 31, 2006

(65) Prior Publication Data

US 2007/0230341 A1   Oct. 4, 2007

(51) Int. Cl.
*G06F 15/16* (2006.01)
*G01R 31/08* (2006.01)

(52) U.S. Cl. ........ 709/231; 709/230; 709/232; 709/233; 709/234; 370/232

(58) Field of Classification Search .................... 709/231
See application file for complete search history.

(56) References Cited

U.S. PATENT DOCUMENTS

| | | | |
|---|---|---|---|
| 6,757,273 B1 * | 6/2004 | Hsu et al. ................ 370/349 |
| 2002/0152318 A1 * | 10/2002 | Menon et al. ............. 709/231 |
| 2003/0165150 A1 * | 9/2003 | Zimmermann et al. .... 370/412 |
| 2004/0047290 A1 * | 3/2004 | Komandur et al. ........ 370/230 |
| 2004/0198371 A1 * | 10/2004 | Balasubramanian et al. ................. 455/452.2 |
| 2005/0025180 A1 * | 2/2005 | Curcio et al. ............. 370/468 |
| 2005/0232148 A1 * | 10/2005 | Curcio et al. ............. 370/230 |
| 2006/0109856 A1 * | 5/2006 | Deshpande ............... 370/412 |
| 2006/0168289 A1 * | 7/2006 | Wang et al. ............... 709/231 |
| 2008/0181221 A1 * | 7/2008 | Kampmann et al. ....... 370/389 |

* cited by examiner

*Primary Examiner* — Backhean Tiv
*Assistant Examiner* — Alan S Chou
(74) *Attorney, Agent, or Firm* — Wall & Tong, LLP

(57) ABSTRACT

The invention includes a method and apparatus for providing multimedia content. The method includes receiving, at a network element having a first buffer, a data stream conveying a media clip having an associated media bit rate, the media clip intended for transmission toward a wireless terminal having a second buffer, and transmitting the data stream toward the wireless terminal at a media transmission rate determined according to a data rate supported by a radio access network over which the data stream is transmitted toward the wireless terminal. The buffers bridge a mismatch between the media bit rate and media transmission rate. The wireless terminal may select one of a plurality of presentation modes, where the selected presentation mode controls streaming of the media clip to the wireless terminal and presentation of the media clip at the wireless terminal.

17 Claims, 7 Drawing Sheets

400

METHOD AND APPARATUS FOR IMPROVED MULTICAST STREAMING IN WIRELESS NETWORKS

FIELD OF THE INVENTION

The invention relates to the field of communication networks and, more specifically, to multicast streaming of multimedia content in wireless networks.

BACKGROUND OF THE INVENTION

To distribute streaming multimedia content to multiple mobile devices, service providers typically use the cost-effective broadcast multicast architecture of Third Generation (3G) wireless networks. In the existing 3G broadcast multicast architecture, multimedia content is broadcast to mobile terminals over a radio access network (RAN) using associated multicast groups. Since RANs may be implemented using various technologies, existing standards do not specify physical layer data rates associated with RANs. Disadvantageously, although high quality streaming multimedia content may be available, since media bit rate of streaming multimedia content is restricted by transmission rate in the associated RAN, associated mobile terminals receive streaming multimedia content having significantly reduced quality.

SUMMARY OF THE INVENTION

Various deficiencies in the prior art are addressed through the invention of a method and apparatus for providing multimedia content. The method includes receiving, at a network element having a first buffer, a data stream conveying a media clip having an associated media bit rate, the media clip intended for transmission toward a wireless terminal having a second buffer, and transmitting the data stream toward the wireless terminal at a media transmission rate determined according to a data rate supported by a radio access network over which the data stream is transmitted toward the wireless terminal. The buffers bridge a mismatch between the media bit rate and media transmission rate. The wireless terminal may select one of a plurality of presentation modes, where the selected presentation mode controls streaming of the media clip to the wireless terminal and presentation of the media clip at the wireless terminal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention enables presentation of the media content on a wireless terminal using terminal-based and network-based buffering of a media stream, thereby enabling significant improvements in media content presentation quality on the wireless terminal. The terminal-based buffering of the media stream enables the wireless terminal terminals to select one of a plurality of available media presentation modes depending on at least one wireless terminal characteristic. The network-based buffering of the media stream enables bridging of a mismatch between a media bit rate of the media content and a transmission rate of the media content, thereby enabling presentation of the media content on the wireless terminal using the media bit rate. The present invention may be used in conjunction with any streaming protocol, including Real-Time Protocol (RTP), proprietary streaming protocols, and the like.

Figure 1:
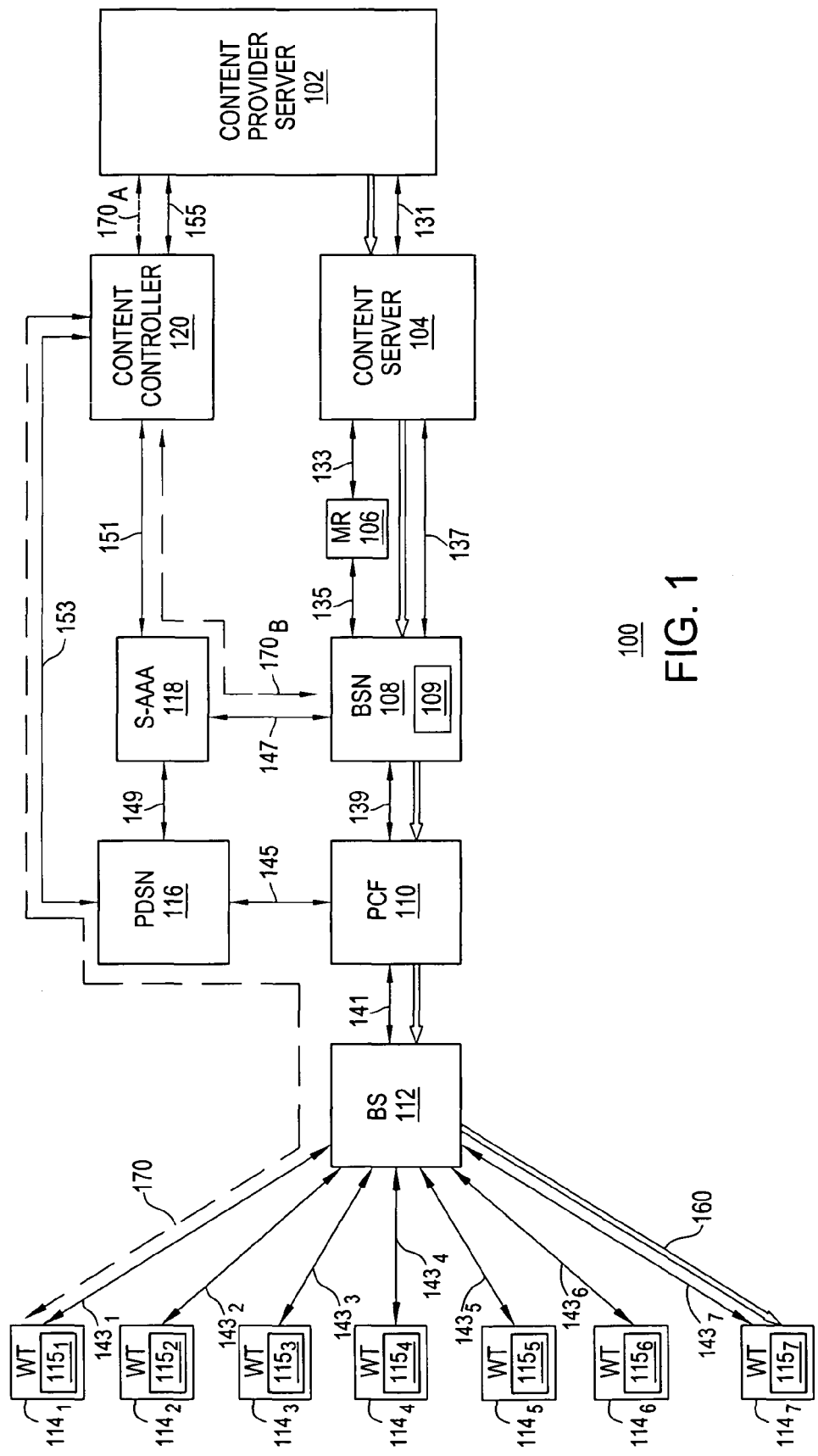
FIG. 1 depicts a high-level block diagram of logical components of a communication network.

FIG. 1 depicts a high-level block diagram of a communication network. In general, communication network 100 of FIG. 1 comprises a communication network supporting broadcast multicast services for wireless terminals. Specifically, communication network 100 of FIG. 1 includes a content provider server (CPS) 102, a content server (CS) 104, a multicast router (MR) 106, a broadcast serving node (BSN) 108, a packet control function (PCF) 110, a base station (BS) 112, a plurality of wireless terminals (WTs) $114_1$-$114_7$ (collectively, WTs 114), a packet data serving node (PDSN) 116, a Serving Authentication, Authorization, Accounting server (S-AAA) 118, and a content controller (CC) 120. As depicted in FIG. 1, PCF 110, BS 112, and WTs 114 operate as a radio access network (RAN).

As depicted in FIG. 1, CPS 102 and CS 104 communicate using a link 131. In one embodiment, CS 104 and BSN 108 communicate using a unicast path 137 which may be a direct link or, alternatively, may include multiple unicast links connected by unicast routers (not depicted) between CS 104 and BSN 108. In one embodiment, CS 104 and BSN 108 communicate using a multicast path 133 from CS 104 to MR 106 and a multicast path 135 from MR 106 to BSN 108. Although depicted as an indirect multicast path between CS 104 and BSN 108, in one embodiment, a direct multicast path may be used between CS 104 and BSN 108. Although not depicted, in one embodiment, one or both of multicast paths 133 and 135 may include multiple multicast paths connected by other routers between CS 104 and MR 106 or MR 106 and BSN 108, respectively.

As depicted in FIG. 1, BSN 108 and PCF 110 communicate using a link 139, and PCF 110 and BS 112 communicate using a link 141. As depicted in FIG. 1, BS 112 and WTs $114_1$-$114_7$ communicate using a plurality of wireless links (WLs) $143_1$-$143_7$ (collectively, WLs 143), respectively. As depicted in FIG. 1, PCF 110 and PDSN 116 communicate using a link 145, S-AAA 118 and BSN 108 communicate using a link 147, S-AAA 118 and PDSN 116 communicate using a link 149, S-AAA and CC 120 communicate using a link 151, CC 120 and PDSN 116 communicate using a link 153, and CC 120 and CPS 102 communicate using a link 155.

As depicted in FIG. 1, CPS 102 provides multimedia content (e.g., audio content, video content, and the like) to CS 104. In one embodiment, CPS 102 provides real-time multimedia content. In one embodiment, CPS 102 stores multimedia content. In one embodiment, content may be provided as programs. In one embodiment, CPS 102 is maintained by a third party provider. In one embodiment, CPS 102 streams content to CS 104. In one embodiment, CPS 102 provides content to CS 104 in response to control signals received from CC 120. In one embodiment, control signals received by CPS 102 from CC 120 may originate from WTs 114 (e.g., content requests initiated by users associated with WTs 114). In this embodiment, signaling originating from WTs 114 may traverse a signaling path originating on WTs 114, traversing BS 112, PCF 110, and PDSN 116, and terminating on CC 120.

As depicted in FIG. 1, CS 104 receives content from CPS 102. The CS 104 encodes multimedia content for transmission to BSN 108 over the core network. In one embodiment, CS 104 provides real-time video encoding of live programs and pre-processed video encoding of scheduled programs. In one embodiment, CS 104 applies application level forward error correction (FEC) to encoded video streams. As depicted in FIG. 1, CS 104 streams content from CPS 102 to BSN 108 (and, optionally, other BSNs (not depicted for purposes of clarity)). In one embodiment, CS 104 streams content to BSN 108, for each multicast group, as a media stream. In one embodiment, CS 104 streams the media stream to BSN 108 for each multicast group using varying levels of quality (depending on the multimedia presentation mode used). The BSN 108 receives the streaming content from CS 104.

As depicted in FIG. 1, CS 104 may stream content to BSN 108 directly (using a unicast connection between CS 104 and BSN 108) or indirectly (using a unicast connection between CS 104 and MR 106 and a multicast connection between MR 106 and BSN 108). In one embodiment, transmission (unicast or multicast) of content from CS 104 to BSN 108 is performed using Internet Protocol (IP) and Real Time Protocol (RTP). In one embodiment, CS 104 distributes content to BSN 108 using IP multicast (where BSN 108 functions as one of the leaves of the IP multicast tree (and, optionally, other BSNs (not depicted for purposes of clarity) function as other leaves of the IP multicast tree). In one embodiment, CS 104 distributes content to BSN 108 using unicast over dedicated IP tunnels between CS 104 and BSN 108 (and, optionally, other BSNs).

As depicted in FIG. 1, for given content, BSN 108 advertises the media group to WTs 114, and each WT 114 may select one of the media groups conveying preferred content. A media stream is associated with a respective media group. The media group is conveyed using a respective multicast flow. In one embodiment, a content identifier identifies content conveyed by a media stream and a multicast flow identifier identifies the multicast flow conveying the media stream. In one embodiment, BSN 108 only advertises a media stream in response to a request by one or more of WTs 114. In one such embodiment, BSN 108 only advertises a media stream in response to a threshold number of requests by WTs 114. The WTs 114 may join and leave the media groups (and, therefore, the associated multicast flows) dynamically.

As depicted in FIG. 1, BSN 108 includes a memory 109 adapted for buffering media streams received from CS 104 for transmission to WTs 114 using respective multicast flows. In one embodiment, BSN 108 manages memory 109 as a plurality of per-media buffers (i.e., per-clip buffers) comprising associated per-clip buffer spaces. The BSN per-clip buffer space on memory 109 may be preconfigured, dynamically configured on a per-clip basis (e.g., depending on the size of the media clip buffered by BSN 108), and the like. The memory 109 enables BSN 108 to bridge the mismatch between the transmission rate in the core network (i.e., between CS 104 and BSN 108) and the transmission rate in the radio access network (i.e., between BSN 108 and WTs 114, wherein transmission rate in the radio access network is limited by physical layer data rate).

As depicted in FIG. 1, BSN 108 multicasts content to WTs 114. As depicted in FIG. 1, BSN 108 multicasts media streams to WTs 114 belonging to the respective media groups using multicast flows associated with the media groups (i.e., each media stream is multicast over a different multicast tree using a different multicast flow associated with a different media group). The BSN 108 transmits multicast traffic to PCF 110. In one embodiment, BSN 108 transmits the multicast traffic to PCF 110 using an A10 interface. The PCF 110 transmits multicast traffic to BS 112. In one embodiment, PCF 110 transmits the multicast traffic to BS 112 using an A8 interface. The BS 112 includes a base station controller and at least one base transceiver station controlled by the base station controller. The BS 112 transmits the multicast traffic to WTs 114.

As depicted in FIG. 1, a data channel 160 conveys multimedia content from CPS 102 to WT $114_7$. As depicted in FIG. 1, data channel 160 traverses a path including CPS 102, CS 104, MR 106 (optionally), BSN 108, PCF 110, BS 112, and WT $114_7$. As depicted in FIG. 1, a control channel 170, including control channel portions $170_A$ and $170_B$, conveys control information between WTs 114 and communication network 100. As depicted in FIG. 1, control channel 170 traverses a path including WT $114_1$, BS 112, PCF 110, PDSN 116, and CC 120, control channel portion $170_A$ traverses a path including CC 120 and CPS 102, and control channel portion $170_B$ traverses a path including CC 120, S-AAA 118, and BSN 108.

As depicted in FIG. 1, WTs 114 may be adapted for processing data signals and control signals associated with such data channels and control channels. In one embodiment, WTs 114 comprise mobile handsets. In one embodiment, in which communication network 100 is implemented as a CDMA2000 1xRTT network, WTs 114 may be denoted as mobile stations (MSs). In one embodiment, in which communication network 100 is implemented as a CDMA2000 EvDO network or CDMA2000 HRPD network, WTs 114 may be denoted as access terminals (ATs). Although primarily described herein as mobile handsets, in one embodiment, various other wireless devices may receive, buffer, and process media clips as well as various other content in accordance with the present invention.

As depicted in FIG. 1, WTs 114 include wireless terminals operable for receiving, processing, and transmitting various wireless signals adapted for conveying various information, including voice content, multimedia content, control signals and the like, as well as various combinations thereof. In one embodiment, WTs 114 are adapted to present content. In one embodiment, WTs 114 process received media streams to form presentation streams for presenting content conveyed by the media streams (e.g., a media clip). In one embodiment, a presentation stream may have an associated presentation rate which may vary based on the extent of the bridging of the mismatch between the media transmission rate and the media bit rate (e.g., WTs may present media clips at respective media presentation rates if the entire mismatch is bridged).

As depicted in FIG. 1, WTs 114 include user interfaces. The WTs 114 may process received information (e.g., voice communication, video clips, and the like) for presentation via the user interface (e.g., speaker, screen, and the like). The WTs 114 may process information (e.g., voice communications, pictures, and the like) captured via the user interface (e.g., microphone, camera, and the like) for transmission toward the network. As depicted in FIG. 1, WTs $114_1$-$114_7$ include a plurality of buffers $115_1$-$115_7$ (collectively, buffers 115), respectively. In one embodiment, WTs 114 may include various other control modules, input-output modules, interface modules, and the like, as well as various combinations thereof. In one embodiment, control channels may be implemented between WTs 114 and network elements (illustratively, CC 120, BSN 108, and the like) for performing various control functions.

In one embodiment, WTs 114 utilize control channels for conveying control signals adapted for controlling multimedia content received by WTs 114. In one embodiment, the control signals may include commands entered by users via user interfaces of WTs 114. In one embodiment, control signals adapted for controlling multimedia content may be transmitted from WTs 114 to CC 120 (e.g., traversing BS 112, PCF 110, and PDSN 116 (illustratively, control channel 170)). In one embodiment, control channels between WTs 114 and CC 120 may be implemented as bidirectional unicast connections. In one such embodiment, WTs 114 may retrieve information (e.g., content, session, and the like) from CC 120 using Transmission Control Protocol (TCP) and Hypertext Transfer Protocol (HTTP).

As depicted in FIG. 1, CC 120 processes control signals received from WTs 114. The CC 120 signals CPS 102 according to commands conveyed by the control signals received from WTs 114 (illustratively, using control channel portion $170_A$). In one embodiment, in which control signals received from WTs 114 include requests for multimedia content, CC 120 may request that CPS 102 begin streaming requested multimedia content (e.g., a requested audio clip, video clip, and the like) towards WTs 114. In one embodiment, in which control signals received from WTs 114 include requests for executing trick-play functions (e.g., rewind, pause, and the like), CC 120 may request that CPS 102 provide trick-play functions for multimedia content streaming from CPS 102 to WTs 114. Although specific control functions are described, CC 120 may support various other functions for controlling CPS 102.

As depicted in FIG. 1, communication network 100 is implemented as a Third Generation Partnership Project Two (3GPP2) Code Division Multiple Access 2000 (CDMA-2000) network. In one embodiment, communication network 100 may be implemented as one of a CDMA2000 One Times Radio Transmission Technology (1xRTT) network, a CDMA2000 Evolution Data Optimized (EvDO) network, a CDMA2000 High Rate Data Packet (HRDP) network, and the like. Although primarily depicted and described herein with respect to a CDMA2000 network, in one embodiment, communication network 100 may be implemented as a Third Generation Partnership Project (3GPP) Universal Mobile Telecommunications System (UMTS) network. Although primarily depicted and described with respect to 3GPP and 3GPP2 networks, in one embodiment, communication network 100 may be implemented using various other networking technologies.

As depicted in FIG. 1, communication network 100 of FIG. 1 is adapted for conveying multimedia content from a content provider (illustratively, CPS 102) to wireless terminals (illustratively, WTs 114). In general, 3GPP2 networks support Broadcast Multicast Service (BCMCS) and 3GPP networks support Multimedia Broadcast Multicast Services (MBMS). In general, multicast is an efficient means of transmitting the identical content to multiple receivers while minimizing network resource usage, supporting a wide range of multimedia services for wireless networks. In general, multimedia services such as live television, news summaries, sports highlights, local traffic and weather reports, and the like, as well as various combinations thereof, may be efficiently delivered (scheduled or on-demand) to wireless terminals using broadcast multicast.

Although 3GPP, 3GPP2, and like networking standards depicted and described with respect to FIG. 1 define specific configurations of network components suggested for providing specific functionality, such standards typically specify logical configurations of network components (leaving physical implementations unspecified). As depicted in FIG. 1, communication network 100 comprises a specific configuration in which each logical component is implemented as a standalone physical component. In one embodiment, depicted and described herein with respect to FIG. 2, various combinations of logical network components depicted and described herein with respect to FIG. 1 may be implemented using other combinations of physical network components.

Figure 2:
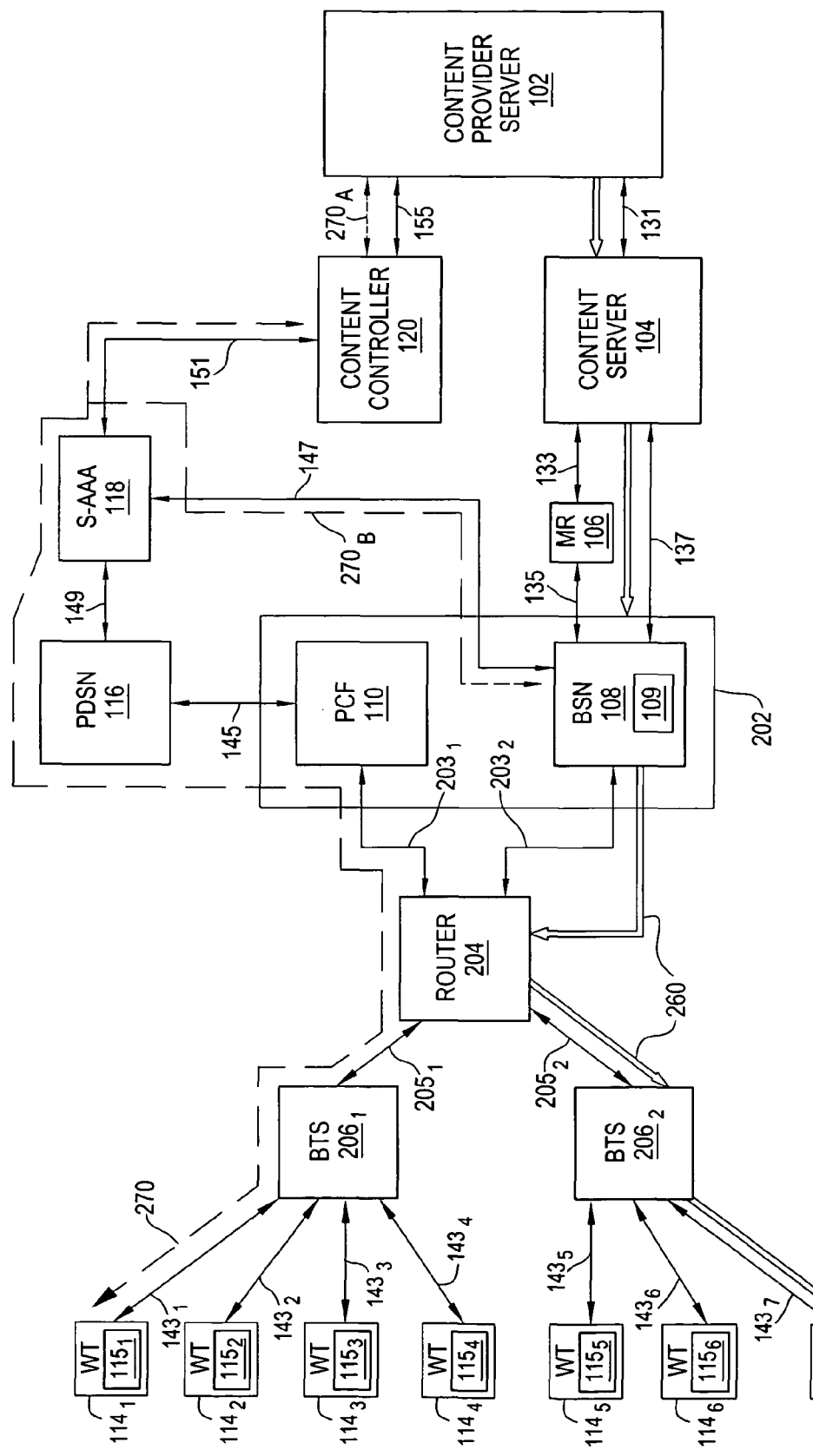
FIG. 2 depicts a high-level block diagram of a physical implementation of the communication network of FIG. 1.

FIG. 2 depicts a high-level block diagram of a physical implementation of the communication network of FIG. 1. Specifically, with some exceptions, physical communication network 200 of FIG. 2 is substantially similar to communication network 100 of FIG. 1. As depicted in FIG. 2, BSN 108 and PCF 110 may be implemented as portions of a base station controller (e.g., radio network controller (RNC)). As depicted in FIG. 2, BSN 108 and PCF 110 communicate with WTs 114 using a router 204 and a plurality of base transceiver stations (BTSs) $206_1$-$206_2$ (collectively, BTSs 206). As depicted in FIG. 2, BSN 108 and PCF 110 communicate with router 204 using links $203_1$ and $203_2$ (collectively, links 203), respectively, and router 204 communicates with BTSs $206_1$ and $206_2$ using links $205_1$ and $205_2$ (collectively, links 205), respectively. As depicted in FIG. 2, BTSs $206_1$ and $206_2$ communicate with WTs $114_1$-$114_4$ and $114_5$-$114_7$, respectively.

As depicted in FIG. 2, a data channel 260 (similar to data channel 160 depicted and described herein with respect to FIG. 1) conveys multimedia content from CPS 102 to WT$114_7$. As depicted in FIG. 2, data channel 260 traverses a path including CPS 102, CS 104, MR 106 (optionally), BSN 108, router 204, BTS $206_2$, and WT $114_7$. As depicted in FIG. 2, a control channel 270 including control channel portions $270_A$ and $270_B$ (similar to control channel 170 and control channel portions $170_A$ and $170_B$ depicted and described herein with respect to FIG. 1), conveys control information between WT $114_1$ and communication network 200. As depicted in FIG. 1, control channel 270 traverses a path including WT $114_1$, BTS $206_1$, router 204, PCF 110, PDSN 116, S-AAA 118, and CC 120. Although omitted for purposes of clarity, each WT 114 may support respective data and control channels.

Although primarily depicted and described herein with respect to specific network configurations of network components, network functions, communication links, data flows, control flows, and the like, the present invention may be implemented using various other network configurations of network components, network functions, communication links, data flows, control flows, and the like, as well as various combinations thereof. Although, for purposes of clarity, depicted and described with respect to one base station (illustratively, BS 112), in one embodiment, BSN 108 may broadcast multicast flows over a plurality of base stations serving respective pluralities of wireless terminals.

As described herein, the present invention dramatically improves video quality experienced by users of wireless terminals by decoupling media transmission rate (associated with the radio access network) and media bit rate (i.e., media display rate at which the media clip is presented to the user of the wireless terminal). In one embodiment, a gateway element (GE) between the content distribution network and the radio access network (e.g., a BSN in CDMA2000, a GGSN in UMTS, and the like) includes a buffer adapted for bridging at least a portion of the mismatch between the media bit rate and the media transmission rate. In one embodiment, each WT includes a buffer adapted for bridging at least a portion of the mismatch between the media bit rate and the media transmission rate.

In one embodiment, presentation of multimedia content at a WT may be performed using one of a plurality of multimedia presentation modes including a "delayed viewing after distribution" mode (depicted and described with respect to FIG. 3), a "delayed viewing with streaming" mode (depicted and described with respect to FIG. 4), an "immediate viewing with streaming" mode (depicted and described with respect to FIG. 5), and the like, as well as various combinations thereof. In one embodiment, the multimedia presentation mode used by a WT may vary according to at least one of GE buffer size and WT buffer size. In one embodiment, the multimedia presentation mode used by a WT may vary according to a viewing delay requirement (e.g., a length of time a user is willing to wait, after requesting multimedia content before presentation of the multimedia content to the user begins).

For purposes of clarity in describing multimedia presentation modes, the "delayed viewing after distribution" mode, "delayed viewing with streaming" mode, and "immediate viewing with streaming" mode are described herein with respect to a constant bit rate video clip of length L time units scheduled for distribution by a content server (illustratively, CS 104) to a plurality of WTs in a multicast group, of which one WT is considered (illustratively, WT $114_1$ of a multicast group including, for example, WTs $114_1$ and $114_7$). For purposes of clarity in describing the multimedia presentation modes, only CS 104, BSN 108, and WT $114_1$ are depicted and described with respect to FIG. 3, FIG. 4, and FIG. 5.

For purposes of clarity in describing the multimedia presentation modes, various configurable parameters (e.g., media bit rate, transmission rates, buffer size, and the like) may be defined. The media bit rate is denoted as $R_O$. The CS transmission rate (illustratively, from CS 104 to BSN 108) is denoted as $R_C$. The BSN per-clip buffer space is denoted as $B_B$. The BSN transmission rate (illustratively, from BSN 108 to WT $114_1$) is denoted as $R_X$. The BSN transmission rate $R_X$ is limited by the radio access network (i.e., limited by a physical layer data rate associated with each BTS, where physical layer data rate varies across BTSS). The WT per-clip buffer space is denoted as $B_H$. The WT presentation delay (i.e., the length of time a user must wait before presentation of the media clip begins) is denoted as W.

Figure 3:
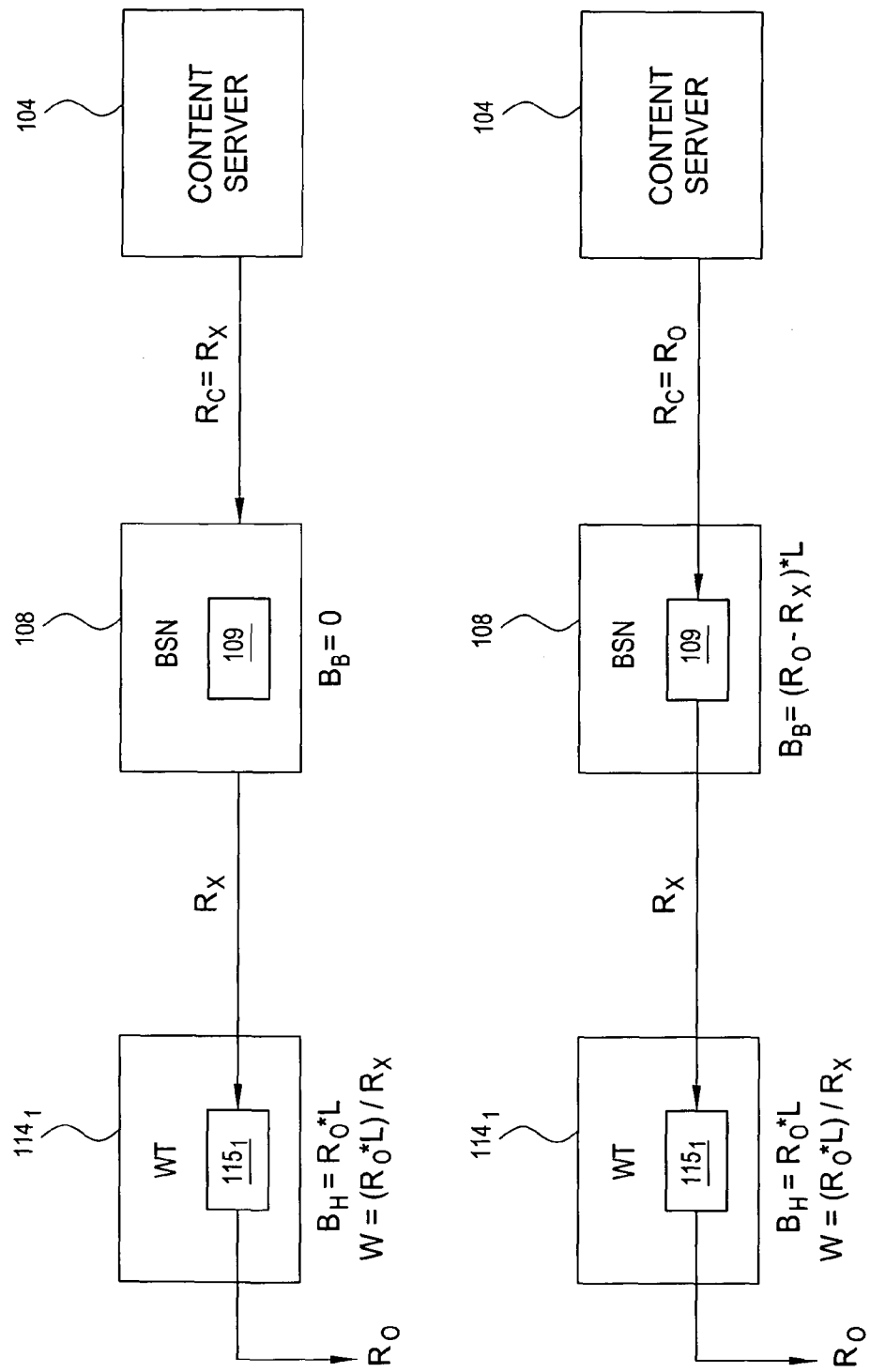
FIG. 3 depicts a high-level block diagram of a portion of the communication network of FIG. 1 in which a wireless terminal uses a "delayed viewing after distribution" multimedia presentation mode.

FIG. 3 depicts a high-level block diagram of a portion of the communication network of FIG. 1 in which a wireless terminal uses a "delayed viewing after distribution" presentation mode. As depicted in FIG. 3, the "delayed viewing after distribution" mode represents an approach in which transmission of the media clip is completely decoupled from presentation of the media clip. In the "delayed viewing after distribution" mode, CS 104 streams the entire media clip to WT $114_1$ for storage (in the associated buffer) prior to presentation of the media clip on the WT $114_1$. In the "delayed viewing after distribution" mode, media bit rate $R_O$ may be much greater than BSN transmission rate $R_X$, and CS 104 may transmit the media clip to BSN 108 using any CS transmission rate $R_C$ equal to or less than media bit rate $R_O$.

In one embodiment, CS 104 transmits the media clip to BSN 108 using CS transmission rate $R_C = R_X$. In this embodiment, since media transmission rate in the core network from CS 104 to BSN 108 is equal to the media transmission rate in the radio access network from BSN 108 to WT $114_1$, BSN 108 does not buffer the media clip (i.e., $B_B = 0$). In one embodiment, CS 104 transmits the media clip to BSN 108 using CS transmission rate $R_C = R_O$. In this embodiment, since the media transmission rate in the core network from CS 104 to BSN 108 is greater than the media transmission rate in the radio access network from BSN 108 to WT $114_1$, BSN 108 buffers at least a portion of the media clip for bridging the mismatch between CS transmission rate $R_C$ and BSN transmission rate $R_X$. In one such embodiment, BSN per-clip buffer space is $B_B = (R_O - R_X) * L$, and must be large enough to prevent a buffer overflow condition on BSN 108.

As depicted in FIG. 3, BSN 108 multicasts the media clip to WT $114_1$ using BSN transmission rate $R_X$. As described herein, in one embodiment, BSN transmission rate $R_X$ is determined according to a physical layer data rate associated with the BTS traversed by the multicast stream from BSN 108 to WT $114_1$ (illustratively, BTS $206_1$). In one embodiment, presentation of the media clip on the WT $114_1$ begins after the entire media clip is received and stored by WT $114_1$. In this embodiment, the WT per-clip buffer space on WT $114_1$ is $B_H = R_O * L$. In one embodiment, presentation of the media clip on WT $114_1$ begins after a significant portion of the media clip is received and stored by WT $114_1$. As depicted in FIG. 3, the media clip is presented by WT $114_1$ at the media bit rate $R_O$ (i.e., buffers on BSN 108 and WT $114_1$ bridge the mismatch between media bit rate and BSN transmission rate within RAN).

Although media clip presentation quality may be significantly improved using the "delayed viewing after distribution" mode, the user associated with WT $114_1$ must be willing to wait while the entire media clip L (or at least a significant portion of the media clip L) is transmitted to and stored in WT $114_1$. In one embodiment, in which presentation of the media clip on the WT $114_1$ begins after the entire media clip is received and stored by WT $114_1$, the presentation delay experienced by a user associated with WT $114_1$ is $W = B_H/R_X = (R_O * L)/R_X$. In one embodiment, a presentation delay requirement parameter may be stored (locally on the wireless terminal or, alternatively, within the network) for providing an indication as to the maximum presentation delay W deemed acceptable to the user associated with the wireless terminal.

For example, CS 104 may stream a high quality video clip ($R_C = R_O = 500$ Kbps) to BSN 108 for distribution to at least one wireless terminal using at least one base transceiver station. In this example, even assuming BSN 108 multicasts the video clip toward WT $114_1$ using a BSN transmission rate $R_X$ limited to 50 Kbps, using the present invention, WT $114_1$ may still present the high quality video clip to the user at the high quality 500 Kbps video bit rate. In this example, although ten times as much time is required to distribute the video clip as is required to present the video clip, the video clip may be presented to the user at a much higher quality (e.g., using a 500 Kbps video bit rate rather than a 50 Kbps video bit rate) than would otherwise be possible in the absence of the present invention.

Figure 4:
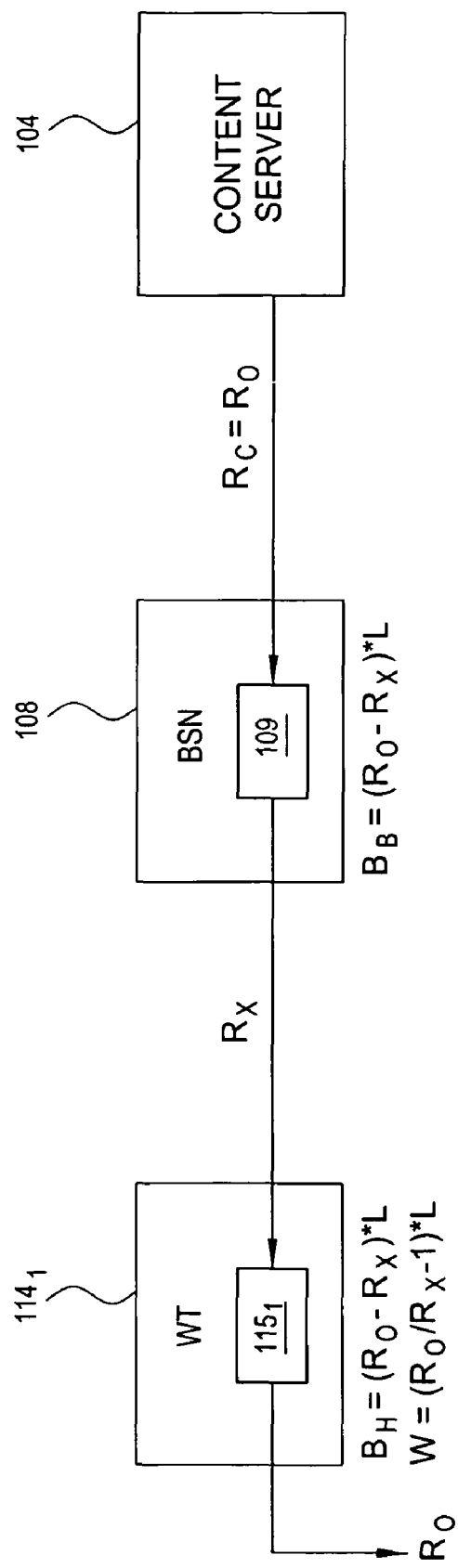
FIG. 4 depicts a high-level block diagram of a portion of the communication network of FIG. 1 in which a wireless terminal uses a "delayed viewing with streaming" multimedia presentation mode.

FIG. 4 depicts a high-level block diagram of a portion of the communication network of FIG. 1 in which a wireless terminal uses a "delayed viewing with streaming" presentation mode. As depicted in FIG. 4, the "delayed viewing with streaming" mode represents an approach in which transmission of the media clip is partially decoupled from presentation of the media clip. In the "delayed viewing with streaming" mode, CS 104 begins transmitting the media clip to WT $114_1$, and presentation of the media clip on the WT $114_1$ begins after a portion of the media clip is stored on WT $114_1$. In the "delayed viewing with streaming" mode, as long as the buffer on WT $114_1$ does not underflow during presentation of the media clip, presentation of the media clip may begin prior to storage of the entire media clip on WT $114_1$.

As depicted in FIG. 4, CS 104 streams the media clip to BSN 108. In one embodiment, CS 104 streams the media clip to BSN 108 using CS transmission rate $R_C=R_X$. In this embodiment, since the media transmission rate from CS 104 to BSN 108 is equal to the media transmission rate from BSN 108 to WT $114_1$, BSN 108 does not buffer the media clip (i.e., $B_B=0$). In one embodiment, CS 104 transmits the media clip to BSN 108 using CS transmission rate $R_C=R_O$. In this embodiment, since the media transmission rate in the core network from CS 104 to BSN 108 is greater than the media transmission rate in the radio access network from BSN 108 to WT $114_1$, BSN 108 buffers at least a portion of the media clip for bridging the mismatch between CS transmission rate $R_C$ and BSN transmission rate $R_X$. In this embodiment, BSN pre-clip buffer size is $B_B=(R_O-R_X)*L$, and must be large enough to prevent a buffer overflow condition on BSN 108.

As depicted in FIG. 4, BSN 108 multicasts the media clip to WT $114_1$ using BSN transmission rate $R_X$. As described herein, in one embodiment, BSN transmission rate $R_X$ is determined according to a physical layer data rate associated with the BTS traversed by the multicast stream from BSN 108 to WT $114_1$ (illustratively, BTS $206_1$). In other words, BSN transmission rate $R_X$ is limited by transmission capabilities of the radio access network. The WT $114_1$ begins receiving the multicast flow from BSN 108 which conveys the media clip. In the "delayed viewing with streaming" mode, WT $114_1$ stores a beginning portion of the media clip on a buffer associated with WT $114_1$ before presentation of the media clip begins.

In one embodiment, WT $114_1$ stores a beginning portion of the media clip on a buffer associated with WT $114_1$ in a manner for preventing buffer underflow and buffer overflow. In one embodiment, in order to avoid buffer underflow on a buffer associated with WT $114_1$, the following condition must be satisfied: $R_X*L+B_H=(R_O-R_X)*L$. In this embodiment, the WT per-clip buffer space required on WT $114_1$ is $B_H=(R_O-R_X)*L$. In one embodiment, WT$114_1$ only begins presenting a media clip after the buffer associated with WT $114_1$ is filled (or, optionally, at least partially filled). Since at least a portion of the media clip is stored prior to presentation of the media clip beginning, the presentation delay experienced by a user associated with WT $114_1$ is $W=B_H/R_X=((R_O-R_X)*L)/R_X=((R_O/R_X)-1)*L$.

Although depicted and described with respect to an embodiment in which BSN 108 is connected to one BTS (illustratively, BTS $206_1$), in one embodiment, BSN 108 may be connected to a plurality of BTSS. In one such embodiment, for a given media clip, BSN 108 multicasts the media stream to each BTS 206 serving a WT 114 configured to receive the media clip. In this embodiment, since BSN transmission rate $R_X$ from BSN 108 to each BTS 206 may vary (according to associated physical layer data rates of BTSs 206), the BSN per-clip buffer space must be sufficient to accommodate the minimum BSN transmission rate (denoted as $R_{X\_min}$). In one embodiment, BSN per-clip buffer space is $B_B=(R_O-R_{X\_min})*L$ and maximum (i.e., longest) presentation delay experienced by a user associated with the WT 114 served by the BTS 206 associated with minimum BSN transmission rate $R_{X\_min}$ (denoted as $W_{MAX}$) is computed as $W_{MAX}=((R_O/R_{X\_min})-1)*L$.

In both "delayed viewing" multimedia presentation modes described herein, a BSN buffer may be used for bridging a mismatch between CS transmission rate $R_C$ (where $R_C$ may be equal to media bit rate $R_O$) and BSN transmission rate $R_X$, enabling presentation of media clips having significantly improved media quality. As described herein, depending on implementations of "delayed viewing after distribution" and "delayed viewing with streaming" presentation modes, the "delayed viewing with streaming" mode requires approximately the same BSN per-clip buffer space $B_B$ on BSN 108 as required by the "delayed viewing after distribution" mode; however, the "delayed viewing with streaming" mode requires less WT per-clip buffer space $B_H$ on WT $114_1$ and shorter presentation delay W experienced by a user associated with WT$114_1$ than required by the "delayed viewing after distribution" mode.

Figure 5:
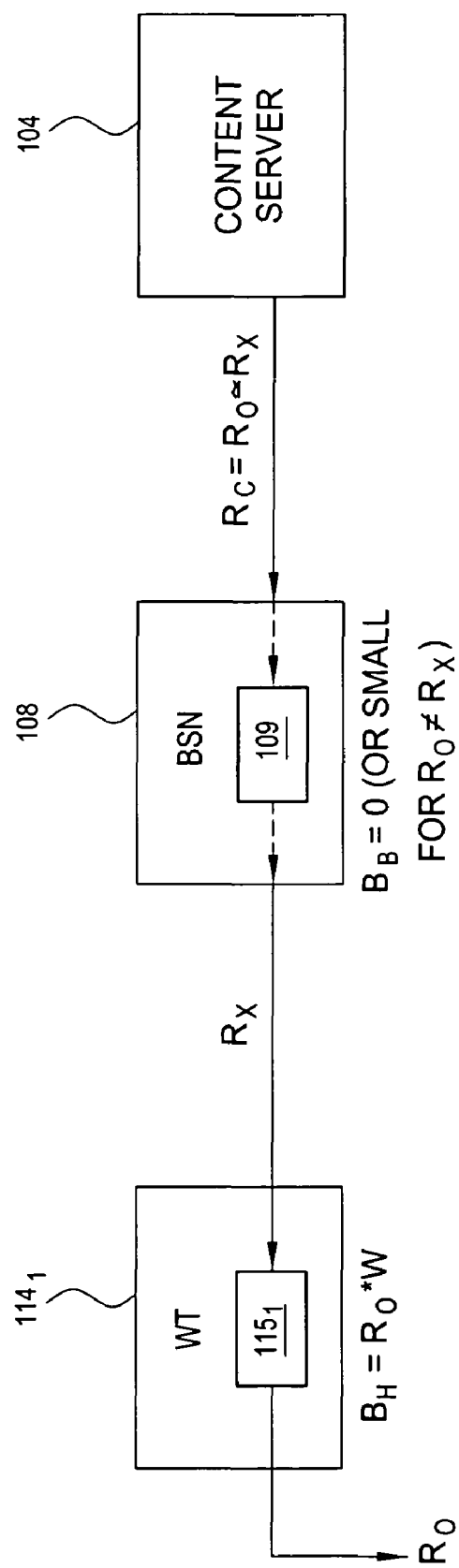
FIG. 5 depicts a high-level block diagram of a portion of the communication network of FIG. 1 in which a wireless terminal uses an "immediate viewing with streaming" multimedia presentation mode.

FIG. 5 depicts a high-level block diagram of a portion of the communication network of FIG. 1 in which a wireless terminal uses an "immediate viewing with streaming" multimedia presentation mode. As depicted in FIG. 5, the "immediate viewing with streaming" mode represents an approach in which transmission of the media clip is directly coupled to presentation of the media clip. Since media clip transmission and presentation occur in parallel, media bit rate $R_O$ is restricted by BSN transmission rate $R_X$; however, less buffer space is required on WT $114_1$ and shorter presentation delay time W is required before presentation of the media clip begins on WT $114_1$ (as compared to the "delayed viewing after distribution" and "delayed viewing with streaming" modes).

The "immediate viewing with streaming" mode is generally adequate for live media streams for which a user is unwilling to accept a long presentation delay W. In the "immediate viewing with streaming" mode, the primary purpose of the buffer on WT $114_1$ is for absorbing jitter. In one embodiment, WT per-clip buffer space $B_H$ of the buffer on WT $114_1$ is preconfigured. In one embodiment, WT per-clip buffer space $B_H$ of the buffer on WT $114_1$ is configurable (e.g., by a user associated with WT $114_1$). In one embodiment, WT per-clip buffer space $B_H$ of the buffer on WT $114_1$ may be set to be about 5-30 seconds. In one embodiment, due to limitations on the size of the buffer on WT $114_1$, media bit rate $R_O$, CS transmission rate $R_C$, and BSN transmission $R_X$ must satisfy the following conditions: $R_O<R_C$ and $R_O\leq R_X$.

As depicted in FIG. 5, CS 104 streams the media clip to BSN 108. In one embodiment, CS 104 streams the media clip to BSN 108 at media bit rate $R_O$ while attempting to match media bit rate $R_O$ to BSN transmission rate $R_X$. In one embodiment, if media transmission rate in the core network from CS 104 to BSN 108 is equal to the media transmission rate in the radio access network from BSN 108 to WT $114_1$, BSN 108 does not buffer the media clip (i.e., $B_B=0$). In one embodiment, if media transmission rate $R_C$ in the core network from CS 104 to BSN 108 is greater than media transmission rate $R_X$ in the radio access network from BSN 108 to WT $114_1$, BSN 108 buffers at least a portion of the media clip for bridging the mismatch between CS 104 transmission rate $R_C$ and BSN 108 transmission rate $R_X$. In this embodiment, per-clip buffer size on BSN 108 is $B_B=(R_O-R_X)*L$.

In one embodiment, as described herein, each WT 114 determines which of the multimedia presentation modes (e.g., "delayed viewing after distribution" mode, "delayed viewing with streaming" mode, "immediate viewing with streaming" mode, and the like) is used for obtaining and presenting multimedia content. In one embodiment, the determination as to which of the multimedia presentation modes is used may be performed using at least one of: the size of the buffer of the wireless terminal, a presentation delay requirement (e.g., indicative of a length of time a user associated with the wireless terminal is willing to wait before presentation of the media clip begins), and the like, as well as various combinations thereof.

Figure 6:
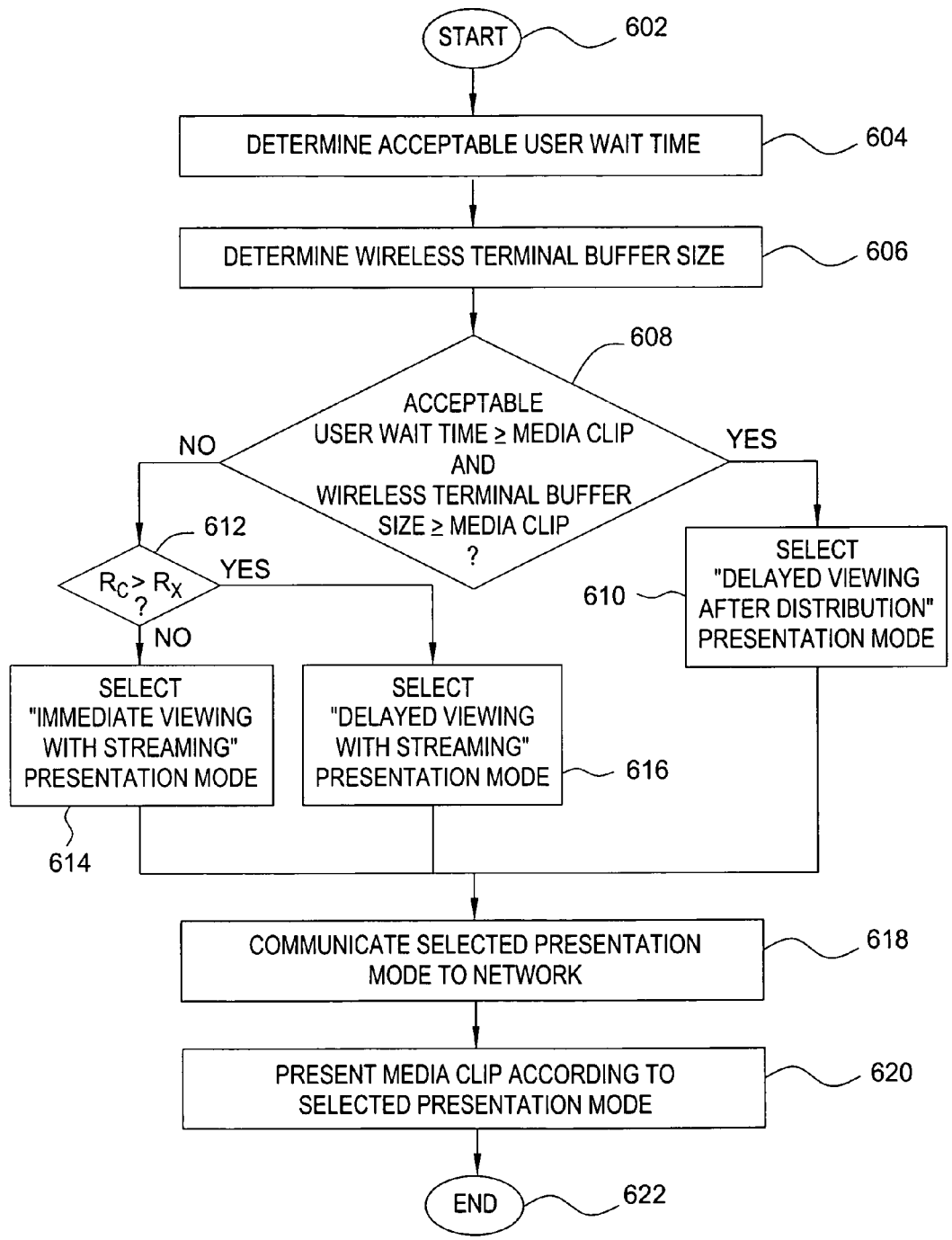
FIG. 6 depicts a method according to one embodiment of the present invention.

FIG. 6 depicts a method according to one embodiment of the present invention. Specifically, method 600 of FIG. 6 depicts a method for providing multimedia content from a content server to a wireless terminal according to a presentation mode selected by the wireless terminal. Although, for purposes of clarity, depicted and described with respect to one wireless terminal, portions of method 600 depicted and described as being performed by the wireless terminal may be performed by a plurality of wireless terminals. Although depicted as being performed serially, those skilled in the art will appreciate that at least a portion of the steps of method 600 may be performed contemporaneously, or in a different order than presented in FIG. 6. The method 600 begins at step 602 and proceeds to step 604.

At step 604, an acceptable user wait time is determined by the wireless terminal. In one embodiment, the acceptable user wait time is determined by the wireless terminal using at least one parameter set by a user associated with the wireless terminal. At step 606, a wireless terminal buffer size is determined by the wireless terminal. In one embodiment, the wireless terminal buffer size is the wireless terminal buffer size available for buffering a media clip. As described herein, the wireless terminal is adapted to selected one of a plurality of presentation modes (depicted and described herein with respect to FIG. 3-FIG. 5) by which a media clip is communicated to the wireless terminal from the network and presented by the wireless terminal.

At step 608, a determination is made as to whether the acceptable user wait time is greater than or equal to the media clip (i.e., whether the user is wiling to wait until the entire media clip is stored on the wireless terminal before presentation of the media clip begins) and whether the wireless terminal buffer size is greater than or equal to the media clip (i.e., whether there is enough available buffer memory on the wireless terminal to buffer the entire media clip before presentation of the media clip begins). Although primarily described with respect to acceptable user wait time and wireless terminal buffer size, in one embodiment, additional parameters may be evaluated by the wireless terminal in order to select a presentation mode.

If the acceptable user wait time is greater than or equal to the media clip and the wireless terminal buffer size is greater than or equal to the media clip, method 600 proceeds to step 610. At step 610, the "delayed viewing after distribution" presentation mode is selected by the wireless terminal. From step 610, method 600 proceeds to step 618. If either the acceptable user wait time is less than the media clip or the wireless terminal buffer size is less than the media clip, method 600 proceeds to step 612. At step 612, a determination is made as to whether the CS transmission rate $R_C$ is greater than the BSN transmission rate $R_X$. In one embodiment, the determination as to whether the CS transmission rate $R_C$ is greater than the BSN transmission rate $R_X$ may be determined by the wireless terminal using date information obtained from the network (e.g., the wireless terminal queries BSN 108 for the CS and BSN transmission rate values).

If the CS transmission rate $R_C$ is not greater than the BSN transmission rate $R_X$, method 600 proceeds to step 614. At step 614, the "immediate viewing with streaming" presentation mode is selected by the wireless terminal. From step 614, method 600 proceeds to step 618. If the CS transmission rate $R_C$ is greater than the BSN transmission rate $R_X$, method 600 proceeds to step 616. At step 616, the "delayed viewing with streaming" presentation mode is selected by the wireless terminal. From step 616, method 600 proceeds to step 618. At step 618, the selected presentation mode is communicated to the network.

The selected presentation mode may be communicated from the wireless terminal to at least one of CS 104, BSN 108, CC 120, and the like, as well as various combinations thereof. In one embodiment, in which the media clip is requested by the wireless terminal, the presentation mode may be communicated to the network as a portion of the request for the media clip. In one embodiment, in which the media clip is pushed to the wireless terminal by the network, the presentation mode may be communicated to the network as a portion of a response to the message from the network initiating the push of the media clip, as one or more separate messages from the wireless terminal to the network, and the like, as well as various combinations thereof.

At step 620, the media clip is presented using the selected presentation mode. In one embodiment, presentation of the media clip using the selected presentation mode includes actions performed within the network (e.g., by CS 104, BSN 108, and the like, as well as various combinations thereof) as the media clip is streamed from CS 104 to the wireless terminal. In one embodiment, presentation of the media clip using the selected presentation mode includes actions performed by the wireless terminal (e.g., buffering at least a portion of the streamed media clip before presentation of the media clip begins). The functions performed for the "delayed viewing after distribution" presentation mode, "delayed viewing with streaming" presentation mode, and "immediate viewing with streaming" presentation mode may be better understood with respect to FIG. 3, FIG. 4, and FIG. 5 depicted and described herein, respectively. At step 622, method 600 ends.

Figure 7:
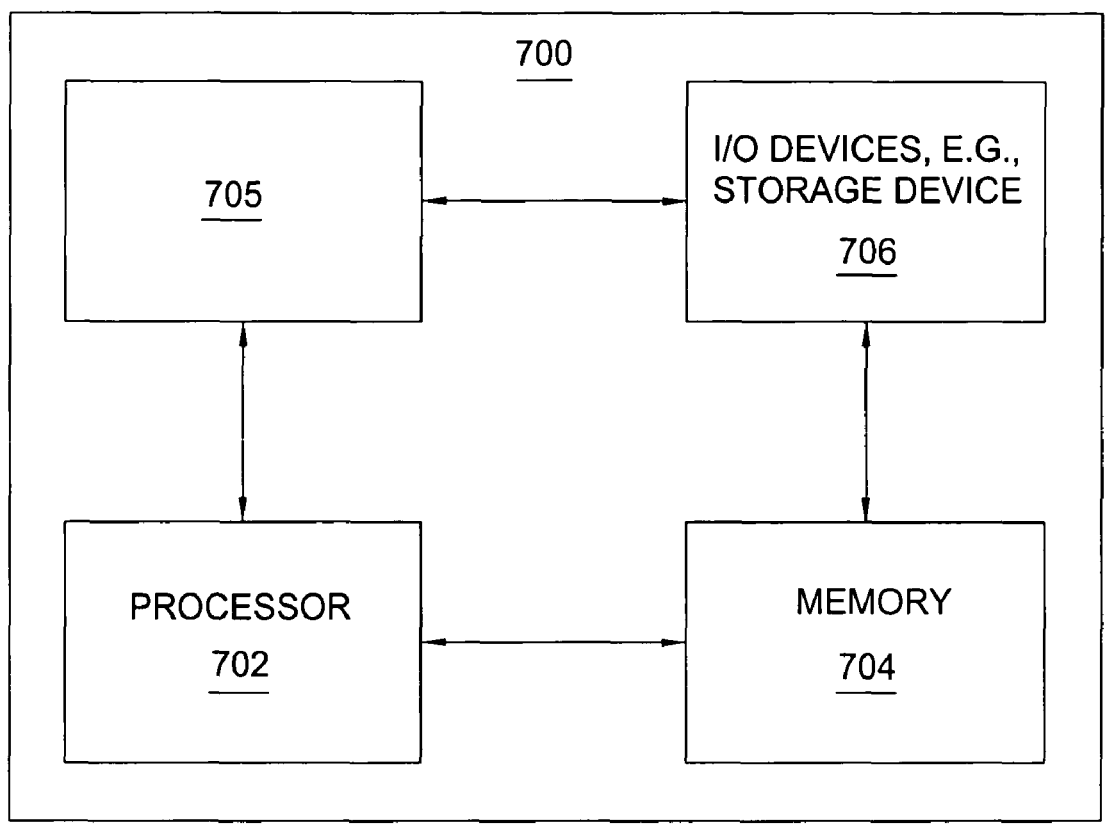
FIG. 7 depicts a high-level block diagram of a general-purpose computer suitable for use in performing the functions described herein.

FIG. 7 depicts a high-level block diagram of a general-purpose computer suitable for use in performing the functions described herein. As depicted in FIG. 7, system 700 comprises a processor element 702 (e.g., a CPU), a memory 704, e.g., random access memory (RAM) and/or read only memory (ROM), a media stream control module 705, and various input/output devices 706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present media stream control process 705 can be loaded into memory 704 and executed by processor 702 to implement the functions as discussed above. As such, media stream control process 705 (including associated data structures) of the present invention can be stored on a computer readable medium or carrier, e.g., RAM memory, magnetic or optical drive or diskette and the like.

Although primarily depicted and described herein with respect to a 3GPP2 CDMA2000 1xRTT network in which a BSN performs media stream buffering for bridging a mismatch in media bit rate and media transmission rate, in one embodiment, media stream buffering may be performed by other network elements within 3GPP2 CDMA2000 networks, within other 3GPP2 CDMA2000 networks (e.g., EvDO, HRPD, and the like), within other 3G networks (e.g., 3GPP UMTS networks), within other wireless-based networks, and the like, as well as various combinations thereof. For example, in one embodiment, at least a portion of the functions of the present invention depicted and described herein with respect to BSNs may be performed by Gateway GPRS Support Nodes (GGSNs) in 3GPP UMTS networks.

Although various embodiments which incorporate the teachings of the present invention have been shown and described in detail herein, those skilled in the art can readily devise many other varied embodiments that still incorporate these teachings.

What is claimed is:

1. A method for presenting a media clip at a wireless terminal comprising a buffer, the method comprising:
    selecting, at the wireless terminal, a presentation mode for presenting the media clip at the wireless terminal;
    determining an acceptable user wait time;
    determining a buffer size associated with the buffer of the wireless terminal;
    determining a size and a length of the media clip; and
    selecting the presentation mode using the acceptable user wait time, the buffer size, and the size of the media clip when the acceptable user wait time is greater than or equal to the length of the media clip and the buffer size is greater than or equal to the size of the media clip, selecting a first presentation mode of the plurality of presentation modes supported by the wireless terminal;
    when the acceptable user wait time is less than the length of the media clip or the buffer size is less than the size of the media clip, selecting one of a second presentation mode or a third presentation mode of the plurality of presentation modes supported by the wireless terminal;
    receiving, at the wireless terminal, a data stream conveying the media clip, the data stream being received at a media transmission rate; and
    presenting the media clip at the wireless terminal, wherein the media clip is presented at a presentation rate that is greater than the media transmission rate, wherein the media clip is presented using the selected presentation mode;
    wherein the buffer is controlled to bridge the mismatch between the media transmission rate and the presentation rate according to the selected presentation mode.

2. The method of claim 1, further comprising:
    buffering the data stream in the buffer to bridge the mismatch between the media transmission rate and the presentation rate.

3. The method of claim 1, wherein the selected presentation mode is selected by the wireless terminal using an acceptable user wait time and a buffer size associated with the buffer of the wireless terminal.

4. The method of claim 3, wherein the the buffer size associated with the buffer of the wireless terminal is a per-clip buffer size.

5. The method of claim 1, wherein the media transmission rate is a first media transmission rate, the method further comprising:
    propagating, toward a network element, an indication of the selected presentation mode;
    wherein the network element receives the media clip at a second media transmission rate and propagates the media clip toward the wireless terminal at the first media transmission rate;
    wherein the indication of the selected presentation mode is adapted for use by the network element in controlling a buffer of the network element to bridge the mismatch between the first media transmission rate and the second media transmission rate.

6. The method of claim 1, wherein the plurality of presentation modes supported by the wireless terminal comprises:
    a delayed viewing after distribution presentation mode;
    a delayed viewing with streaming presentation mode; and
    an immediate viewing with streaming presentation mode.

7. An apparatus configured for presenting a media clip at a wireless terminal comprising a buffer, the apparatus comprising:
    a processor configured for:
    selecting a presentation mode for presenting the media clip at the wireless terminal;
    determining an acceptable user wait time;
    determining a buffer size associated with the buffer of the wireless terminal;
    determining a size and a length of the media clip; and
    selecting the presentation mode using the acceptable user wait time, the buffer size, and the size of the media clip when the acceptable user wait time is greater than or equal to the length of the media clip and the buffer size is greater than or equal to the size of the media clip, selecting a first presentation mode of the plurality of presentation modes supported by the wireless terminal;
    when the acceptable user wait time is less than the length of the media clip or the buffer size is less than the size of the media clip, selecting one of a second presentation mode or a third presentation mode of the plurality of presentation modes supported by the wireless terminal;
    controlling presentation of the media clip at the wireless terminal based on the selected presentation mode, wherein the media clip is received at the wireless terminal at a media transmission rate, wherein the media clip is presented at the wireless terminal at a presentation rate that is greater than the media transmission rate; and
    controlling the buffer, to bridge the mismatch between the media transmission rate and the presentation rate, according to the selected presentation mode.

8. An apparatus for controlling presentation of a media clip at a wireless terminal comprising a buffer, the apparatus comprising:
    a processor configured for:
    determining, at the wireless terminal, an acceptable user wait time and a wireless terminal buffer size;
    selecting a presentation mode for presenting the media clip at the wireless terminal;
        wherein the selected presentation mode is one of a plurality of presentation modes supported by the wireless terminal;
        wherein the selected presentation mode is selected using the acceptable user wait time and the wireless terminal buffer size;
    comparing the acceptable user wait time to a length of the media clip;
    comparing the buffer size associated with the buffer of the wireless terminal to a size of the media clip;
    when the acceptable user wait time is greater than or equal to the length of the media clip and the buffer size is greater than or equal to the size of the media clip, selecting a first presentation mode of the plurality of presentation modes supported by the wireless terminal;
    when the acceptable user wait time is less than the length of the media clip or the buffer size is less than the size of the media clip, selecting one of a second presentation mode or a third presentation mode of the plurality of presentation modes supported by the wireless terminal wherein the first presentation mode is a delayed viewing after distribution presentation mode;

the second presentation mode is a delayed viewing with streaming presentation mode; and the third presentation mode is an immediate viewing with streaming presentation mode; and controlling presentation of the media clip at the wireless terminal according to the selected presentation mode.

9. The apparatus of claim 8, wherein, when the acceptable user wait time is less than the length of the media clip or the buffer size is less than the size of the media clip, the processor is configured for selecting the second presentation mode or the third presentation mode by:

comparing a media transmission rate and a media presentation rate, wherein the media transmission rate is a rate at which the media clip is received at the wireless terminal, wherein the media presentation rate is a rate at which the media clip is presented at the wireless terminal; and selecting the second presentation mode or the third presentation mode based on a result of the comparison of the media transmission rate and the media presentation rate.

10. The apparatus of claim 9, wherein an indication of the media transmission rate is received at the wireless terminal in response to a request initiated by the wireless terminal.

11. The apparatus of claim 10, wherein the request is initiated by the wireless terminal in response to a determination that the acceptable user wait time is less than the length of the media clip or the buffer size is less than the size of the media clip.

12. The apparatus of claim 9, wherein the processor is configured for:

when the media transmission rate is less than the media presentation rate, selecting a delayed viewing with streaming presentation mode; and when the media transmission rate is greater than the media presentation rate, selecting an immediate viewing with streaming presentation mode.

13. The apparatus of claim 12, the first presentation mode is a delayed viewing after distribution presentation mode.

14. The apparatus of claim 8, wherein the plurality of presentation modes comprises:

a delayed viewing after distribution presentation mode;
a delayed viewing with streaming presentation mode; and
an immediate viewing with streaming presentation mode.

15. The apparatus of claim 8, wherein the buffer size associated with the buffer of the wireless terminal is a per-clip buffer size of the wireless terminal.

16. The apparatus of claim 8, wherein the processor is configured for:

communicating an indication of the selected presentation mode toward a network element for use by the network element in controlling buffering of the media clip on the network element.

17. A method for controlling presentation of a media clip at a wireless terminal comprising a buffer, the method comprising:

determining an acceptable user wait time and a buffer size associated with the buffer of the wireless terminal;

selecting a presentation mode for presenting the media clip at the wireless terminal;

wherein the selected presentation mode is one of a plurality of presentation modes supported by the wireless terminal;

wherein the selected presentation mode is selected using the acceptable user wait time and the wireless terminal buffer size;

comparing the acceptable user wait time to a length of the media clip;

comparing the buffer size associated with the buffer of the wireless terminal to a size of the media clip; and when the acceptable user wait time is greater than or equal to the length of the media clip and the buffer size is greater than or equal to the size of the media clip, selecting a first presentation mode of the plurality of presentation modes supported by the wireless terminal;

when the acceptable user wait time is less than the length of the media clip or the buffer size is less than the size of the media clip, selecting one of a second presentation mode or a third presentation mode of the plurality of presentation modes supported by the wireless terminal wherein the first presentation mode is a delayed viewing after distribution presentation mode;

the second presentation mode is a delayed viewing with streaming presentation mode; and the third presentation mode is an immediate viewing with streaming presentation mode; and controlling presentation of the media clip at the wireless terminal according to the selected presentation mode.

* * * * *